L. W. BRIGGS.
Devices for Raising Sunken Vessels.
No. 143,056. Patented September 23, 1873.
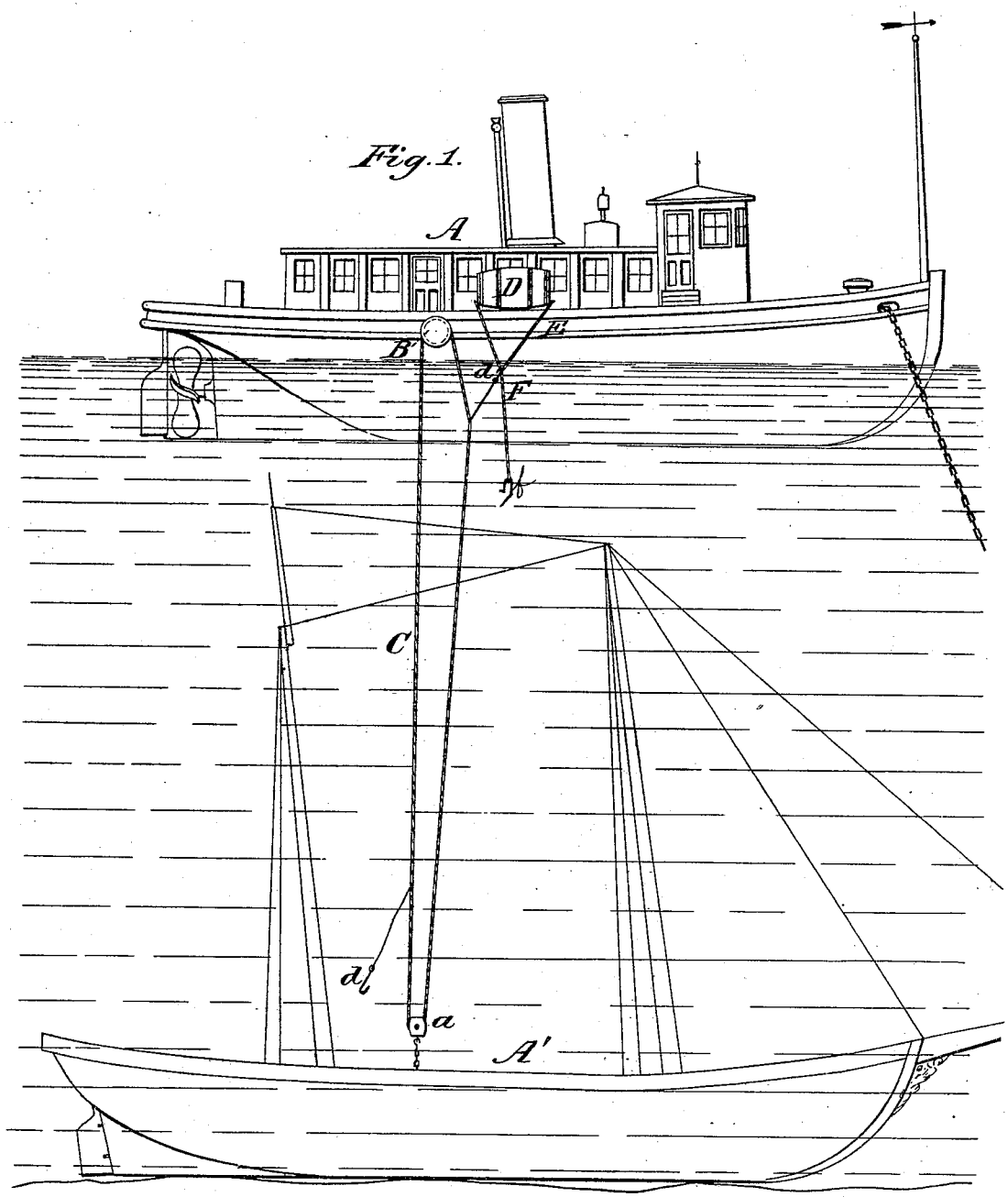

UNITED STATES PATENT OFFICE.

LEWIS W. BRIGGS, OF CHICAGO, ILLINOIS, ASSIGNOR OF TWO-THIRDS HIS RIGHT TO TIMOTHY M. CURTISS AND HENRY H. LADD, OF SAME PLACE.

IMPROVEMENT IN DEVICES FOR RAISING SUNKEN VESSELS.

Specification forming part of Letters Patent No. 143,056, dated September 23, 1873; application filed May 19, 1873.

*To all whom it may concern:*

Be it known that I, LEWIS W. BRIGGS, of the city of Chicago, in the county of Cook and State of Illinois, have invented a new and useful Method of Raising Sunken Ships; and I do hereby declare the following to be a full, clear, and exact description thereof, which will enable others skilled in the art to which my invention appertains to make and use the same, reference being had to the accompanying drawing forming a part of this specification.

My invention has for its object to provide a means for raising sunken ships; and to that end it consists in providing a rope and windlass, which is attached to the side of a vessel which is upon the surface of the water, the rope communicating with the sunken ship, and so arranged as to convey empty barrels to the ship, which are attached thereto, by which means the ship is raised to the surface of the water.

In the drawing, Figure 1 is a side elevation of a ship, showing its position when sunk, and the mechanism for conveying the barrels thereto. Fig. 2 is an enlarged perspective view of the staple by which the barrels are attached to the ship.

Similar letters of reference indicate like parts in both figures of the drawing.

A represents the vessel which is upon the surface of the water, and A' is the sunken ship. B is a windlass, which is attached to the side of the vessel A. This windlass extends through the side of the vessel, and is so arranged as to freely revolve. C is a rope, which is passed around the windlass, and extends downward to the side of the ship A', and around a pulley-block, *a*, which is firmly secured to the side of the ship. This pulley-block is so arranged as to admit of being readily changed to any desired position upon the ship, fore and aft. A series of metal hooks, *d*, are permanently attached to the rope C, as shown. These hooks are so arranged as to pass under the pulley as the rope is carried around by the rotation of the windlass. D is the barrel, which is to be attached to the side of the ship. Permanently attached to each barrel is a rope, F; and permanently attached to this rope, at a point near its center, is a staple, *f*, the lower end of which is made sharp, and is bent at a right angle to its side, as shown in Fig. 2, the object of which is to allow the same to be driven into the side of the ship after the barrel has been drawn down by rope C, thereby firmly securing the barrel to the ship.

The manner of using my invention is as follows: The vessel carrying the windlass is anchored immediately over the sunken ship, and the pulley-block *a* firmly attached thereto. Rope F of the barrel is then placed in hook *d* of rope C, and, as the windlass is rotated, the barrel is drawn down through the water to the ship, and the diver makes it fast thereto by driving the staple *f* into the side of the ship; and when a sufficient number of barrels have been secured to the side of the ship, the same is raised to the surface of the water by the buoyancy of the barrels.

Having thus described my invention, I claim—

In combination with the vessel A, the windlass B, rope C, pulley *a*, and hooks *d*, as described, the rope acting to draw the barrel down through the water, substantially as specified.

LEWIS W. BRIGGS.

Witnesses:
N. H. SHERBURNE,
WILLIAM EDGAR.